(12) United States Patent
Coon et al.

(10) Patent No.: US 6,496,331 B1
(45) Date of Patent: Dec. 17, 2002

(54) CHIP-MOUNTED DISK DRIVE SUSPENSION

(75) Inventors: Warren Coon; Amanullah Khan, both of Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 10/095,995

(22) Filed: Mar. 11, 2002

Related U.S. Application Data

(63) Continuation of application No. 09/172,894, filed on Oct. 15, 1998, now Pat. No. 6,356,413.
(60) Provisional application No. 60/063,887, filed on Oct. 31, 1997.

(51) Int. Cl.[7] .......................... G11B 5/60; G11B 15/64; G11B 17/32; G11B 21/20; G11B 21/16; G11B 5/48
(52) U.S. Cl. ................... 360/244.1; 360/234.4
(58) Field of Search .................... 369/244; 360/244, 360/244.1, 244.2, 244.5, 245, 245.2, 234.4

(56) References Cited

U.S. PATENT DOCUMENTS

| | | | | |
|---|---|---|---|---|
| 4,809,103 A | * | 2/1989 | Lazzari | 360/110 |
| 5,587,857 A | * | 12/1996 | Voldman et al. | 360/234.4 |
| 5,712,747 A | * | 1/1998 | Voldman et al. | 360/234.4 |
| 6,239,947 B1 | * | 5/2001 | Fan et al. | 360/245.9 |

* cited by examiner

Primary Examiner—Robert S. Tupper
Assistant Examiner—Julie Anne Watko
(74) Attorney, Agent, or Firm—Louis J. Bachand

(57) ABSTRACT

The invention provides greatly shortened electrical paths for the wires or traces connecting a disk drive suspension slider to the preamplifier circuit chip without problems of chip wastage by supporting the disk drive suspension assembly of a slider, a flexure, a load beam and a mounting plate, all in operative association on the preamplifier circuit chip, and supporting the chip on the actuator arm.

11 Claims, 5 Drawing Sheets

CHIP-MOUNTED DISK DRIVE SUSPENSION

REFERENCE TO RELATED APPLICATION

This application is a continuation of U. S. patent application Ser. No. 09/172,894, filed on Oct. 15, 1998, now U.S. Pat. No. 6,356,413, which application claims the benefit of Provisional Application Ser. No. 60/063,887, filed Oct. 31, 1997.

BACKGROUND OF THE INVENTION

1. Technical Field

This invention has to do with disk drive suspensions, and more particularly with a head gimbal assembly (HGA) utilizing a disk drive suspension attached to the actuator arm by a preamplifier circuit chip. The invention affords the advantages of extremely short conductive paths from the head/slider to the chip with resultant substantial reduction in noise pick-up and consequent improvement in electrical performance. The invention further enables substantially increased manufacturing efficiencies in the use of preamplifier circuit chips since problems with non-chip components will not cause wastage of chips. The invention utilizes an ultra-compact suspension load beam of approximately the size of the chip to attach to the chip. The chip in turn is attached to the actuator arm.

2. Related Art

Presently known disk drive head stack assemblies (HSA) comprise a series of HGA's arranged in a common stack. The HGA's are connected with conductive wire or traces to a microprocessor chip comprising a central preamplifier circuit. The preamplifier circuit chip controls the read-write action of the slider (which includes the read/write head) and serves to amplify the very weak read signals coming from the slider. Read signals are often so low, e.g., less than 100 microvolts, that merely ambient electrical noise of adjacent equipment can interfere with the detection and processing of the signal. Typically, the preamplifier circuit chip has been placed on the actuator which is at a considerable remove in most suspension systems from the slider. The loss in electrical signal, however, increases with increased path length.

Placing the preamplifier chip closer to the slider presents difficulties, however, both practical and financial. For example, at least in theory, the slider can itself define a chip and provide its own preamplification. This chip-in-slider approach would require a costly development process and the sliders would likely be quite expensive. Moreover, both the chip and the slider will be lost to yield if either is defective. And one cannot tell if either is defective until installed in an HGA.

Or the chip can be placed on the suspension in a manner to be more closely adjacent the slider. This expedient reduces the length of the electrical path for the lowest amplitude signals, reducing noise exposure and lowering the probable error rate. There is the disadvantage, however, of having the chip premounted on the suspension delivered to the disk drive manufacturer and unusable if the suspension for unrelated reasons is not within specifications, wasting the costly chip. Or, the disk drive manufacturer can as part of the drive could add the chip to the suspension. In the chip-on-suspension approach, if the chip is added to the suspension before the slider is added, (which appears necessary since the chip cannot practically be added after the slider is added) the impact on yield of HGA assemblies is greater and the cost more expensive because the scrapped parts represent more value. It is advantageous to add the most expensive components of the suspension as late as possible in the build process after as many of the early step yield losses have already occurred. But, mounting the chip on the suspension before adding the slider obviates this advantage and increases the cost of the discarded assembly, should it be necessary to discard, by the amount involved in acquiring and installing the later discarded chip. The chip-on-suspension approach places the mass of the chip along the middle length of the load beam, and the suspension thus suspends the chip mass. This lowers the resonant frequency of the suspension and provides only lower shock resistance, unlike the invention suspension which places the mass of the chip between the suspension and the actuator arm. Further, the placement of the chip on the load beam is disadvantageous in that the chip so placed is subject to all the physical action of the load beam from bending, twisting, shock and other forces.

SUMMARY OF THE INVENTION

It is an object therefore of the present invention to provide improvements in suspension design. It is a further object to provide a novel HGA design having a suspension supported by the preamplifier circuit chip. Another object is the provision of an HGA in which the electrical leads are greatly shortened between the slider and the preamplifier chip to obtain read signals less subject to noise and attenuation. A still further object is to provide a novel suspension and chip combination which affords all the benefits of the optimum relative placement of the slider and chip, and preserves the suspension gimballing function, while only lengthening the actuator arm that supports the chip and slider combination. Other objects will appear hereinafter.

In the present invention an ultra-compact suspension is preferably used, one occupying as little as one-third or even less lateral area as a conventional small size suspension. The suspension is so small that it is feasible to attach the suspension to the actuator arm by the preamplifier chip. The invention suspension can be used with magnetic or optical heads and associated sliders.

These and other objects of the invention to become apparent hereinafter are realized in the combination of a preamplifier circuit chip and a disk drive suspension assembly of a slider, a flexure, a load beam and a mounting plate, all in operative association; the preamplifier circuit chip supporting the assembly on a disk drive actuator arm.

In this and like embodiments, typically: the assembly mounting plate is adhered to the preamplifier circuit chip, the preamplifier circuit chip being adhered to the actuator arm to support the assembly at the actuator arm; the assembly mounting plate is adhered to the preamplifier chip, or the preamplifier circuit chip has a plurality of support legs extending therefrom, the preamplifier circuit chip being attached to the actuator arm by the support legs to support the assembly at the actuator arm; the assembly and preamplifier circuit chip are disposed in a common stack; the load beam at least partially surrounds the flexure, and the mounting plate is attached to the load beam in flexure bridging relation, the preamplifier circuit chip being attached to the mounting plate at the locus of the flexure-bridging; and, the preamplifier circuit chip and load beam are each generally rectangular and of substantially the same area.

In a further embodiment, the invention provides a disk drive suspension assembly adapted for mounting to a disk drive actuator arm, the suspension assembly comprising a flexure for supporting a slider in operative association with a disk, a load beam supporting the flexure, a mounting plate, and a preamplifier circuit chip having a first surface to which the mounting plate is mounted and a second surface adapted for mounting the preamplifier circuit chip to the actuator arm.

In this and like embodiments, typically: the flexure, the slider, the load beam, the mounting plate, and the preamplifier circuit chip are arrayed in a common stack relation; the mounting plate is adhered to the preamplifier circuit chip, and includes also a disk drive actuator arm, the preamplifier circuit chip being adhered to the actuator arm to support the suspension assembly at the actuator arm, or the mounting plate is adhered to the preamplifier circuit chip, the preamplifier circuit chip having a plurality of support legs extending therefrom, and includes also a disk drive actuator arm, the preamplifier circuit chip being adhered to the actuator arm by the support legs; the load beam at least partially surrounds the flexure, and the mounting plate is attached to the load beam in flexure bridging relation, the preamplifier circuit chip being attached to the mounting plate at the locus of the flexure-bridging; the preamplifier circuit chip and load beam are each generally rectangular, are of like surface area, and opposed in the stacked condition of the suspension; there is also included an actuator arm and disk, the actuator arm extending longitudinally in a predetermined first plane generally parallel with the disk; the flexure, load beam, mounting plate and preamplifier circuit chip being arrayed in a common stack extending within a cylindrical second plane, the cylindrical plane intersecting the actuator arm plane; the cylindrical second plane intersects the actuator arm first plane at a right angle; the cylindrical second plane has a diameter sufficient to surround the common stack and no greater than three times the diameter necessary to surround the preamplifier circuit chip in the common stack; the assembly mounting plate is adhered to the preamplifier circuit chip, the preamplifier circuit chip being adhered to the actuator arm to support the assembly at the actuator arm; the load beam at least partially surrounds the flexure, and the mounting plate is attached to the load beam in flexure bridging relation, the preamplifier circuit chip being attached to the mounting plate at the locus of the flexure-bridging; and, the preamplifier circuit chip and load beam are each generally rectangular and of substantially the same surface area.

Preferably, the load beam has generally an E-shape with a base, and extending from the base a center portion, a left portion and right portion all generally extending in a load beam plane, the flexure generally extends in a flexure plane spaced from and generally parallel to the load beam plane, the flexure being attached to the left and right load beam portions and in gimballing contact with the load beam, a slider supported by the flexure for operative association with the disk, and a mounting plate extending in a mounting plate plane spaced from and generally parallel to the flexure plane, the mounting plate being attached to the load beam at it's the left and right portions only to bridge the flexure; the mounting plate is centrally deflected, the mounting plate being adhered to the preamplifier circuit chip at the deflection; and the suspension is provided in further combination with electrical leads attached between the preamplifier circuit chip and the slider head, and from the preamplifier circuit chip to suspension control electronics.

In its method aspects the invention provides the method of assembling a disk drive suspension and preamplifier circuit chip combination, including arranging the slider, the flexure, the load beam and the mounting plate in stacked and interconnected relation, attaching a preamplifier circuit chip to the mounting plate, and attaching the preamplifier circuit chip to an actuator arm.

BRIEF DESCRIPTION OF THE DRAWINGS

The invention will be further described in conjunction with the attached drawings in which.

DETAILED DESCRIPTION OF THE INVENTION

Figure 1:
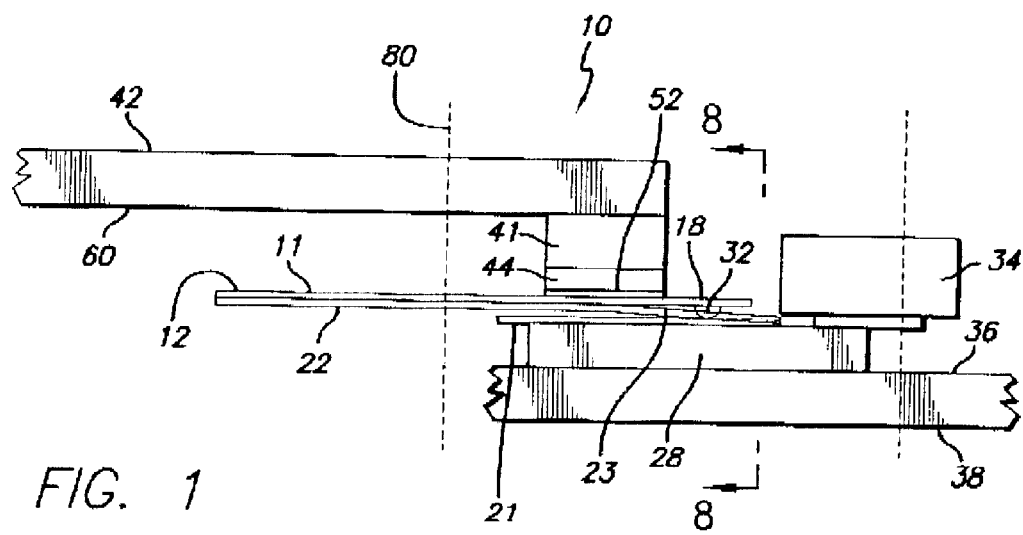
FIG. 1 is a side elevation view of the chip-supported suspension of the invention.
Figure 2:
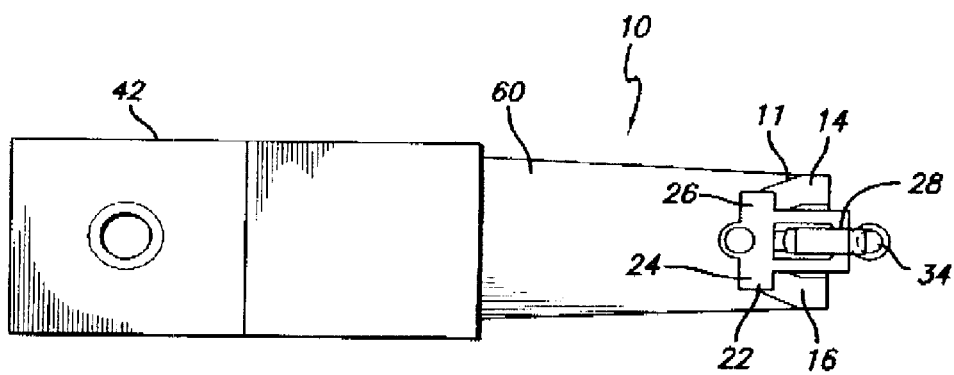
FIG. 2 is a bottom plan view thereof.
Figure 3:
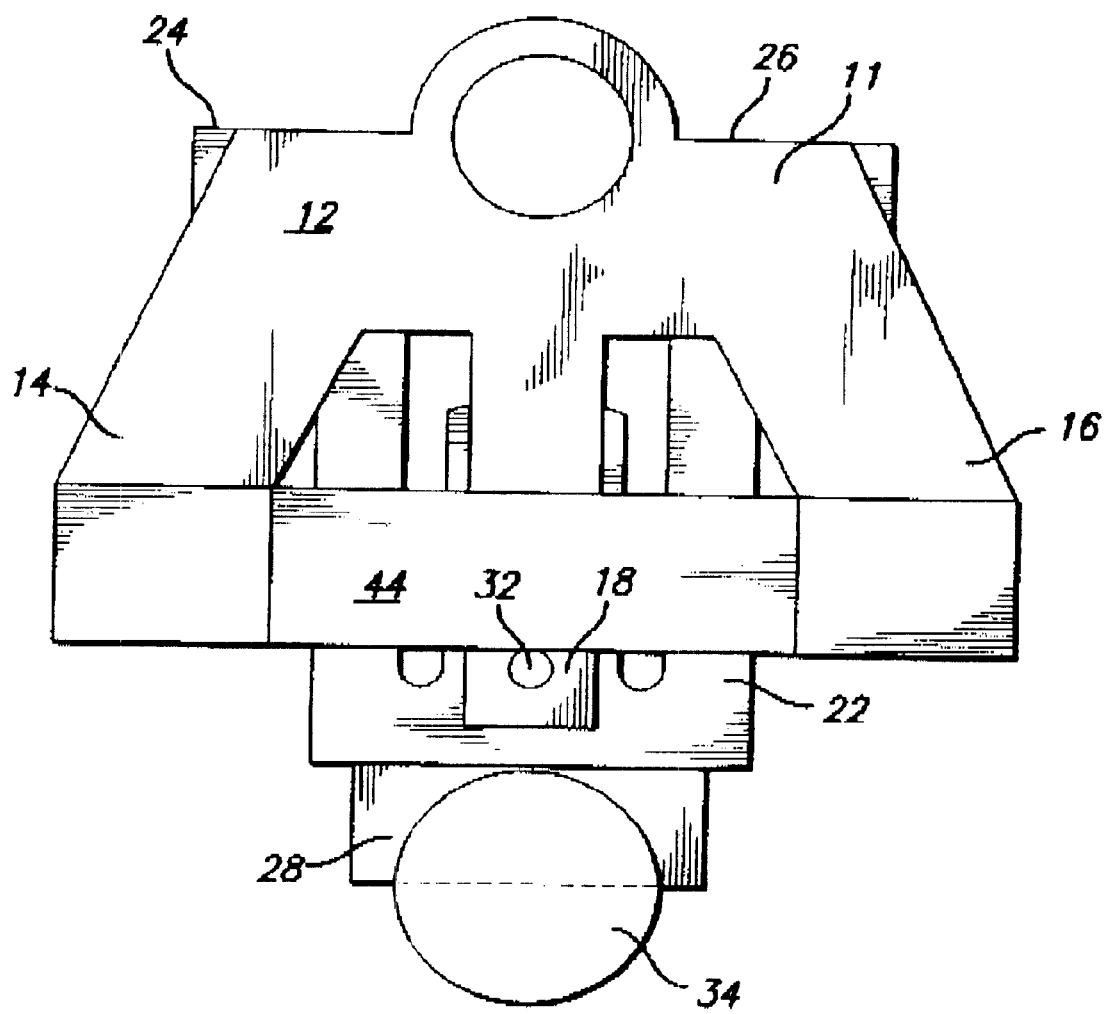
FIG. 3 is a top plan view of the suspension portion of the assembly.
Figure 4:
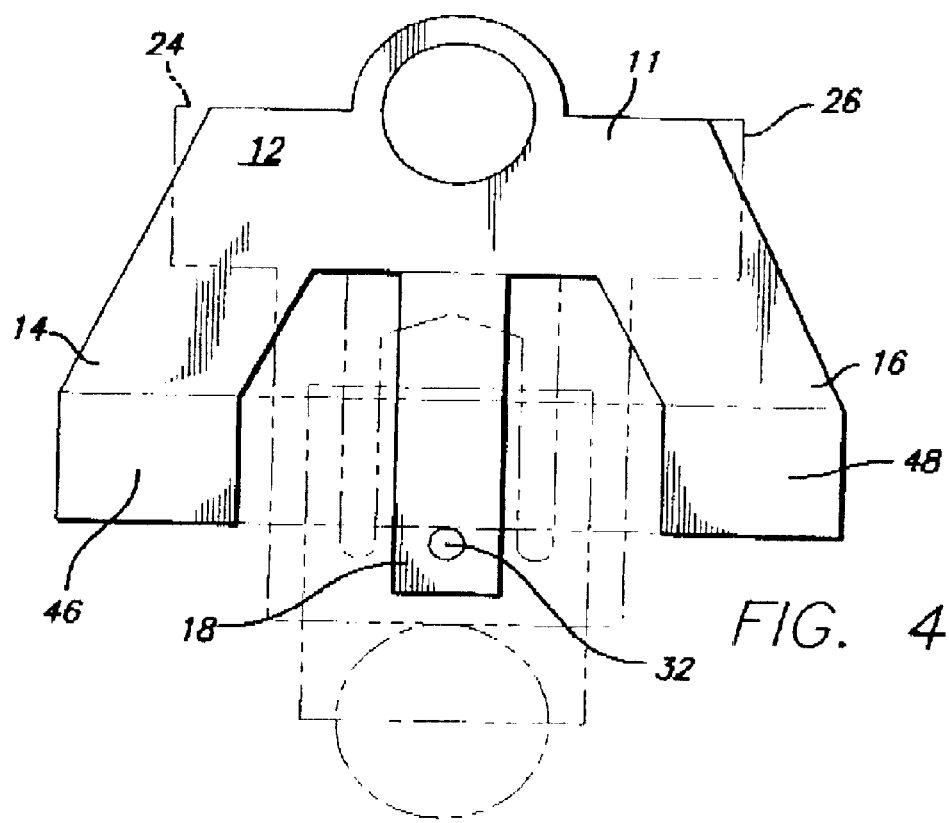
FIG. 4 is a top plan view of the load beam portion thereof.
Figure 5:
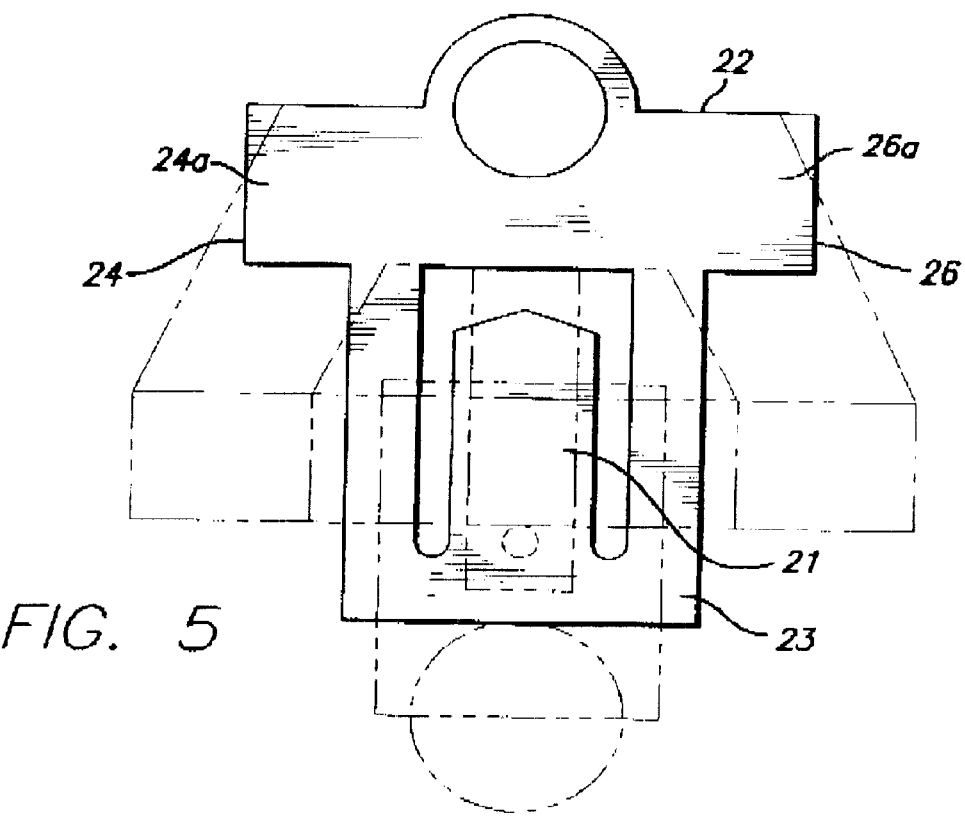
FIG. 5 is a top plan view of the flexure portion thereof.
Figure 6:
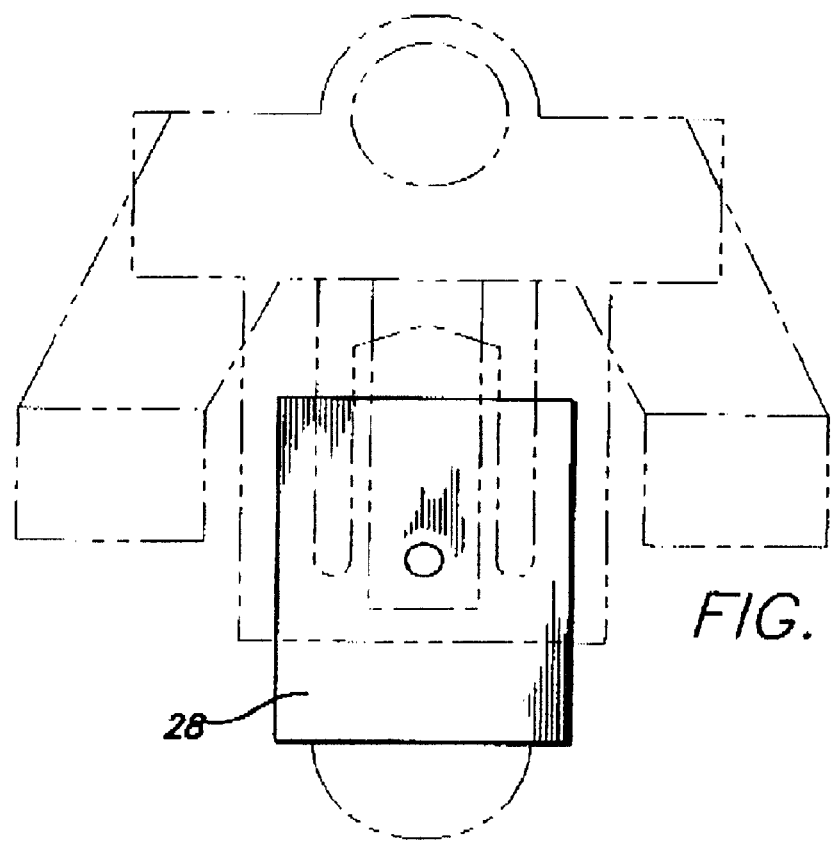
FIG. 6 is a top plan view of the head slider portion thereof.
Figure 7:
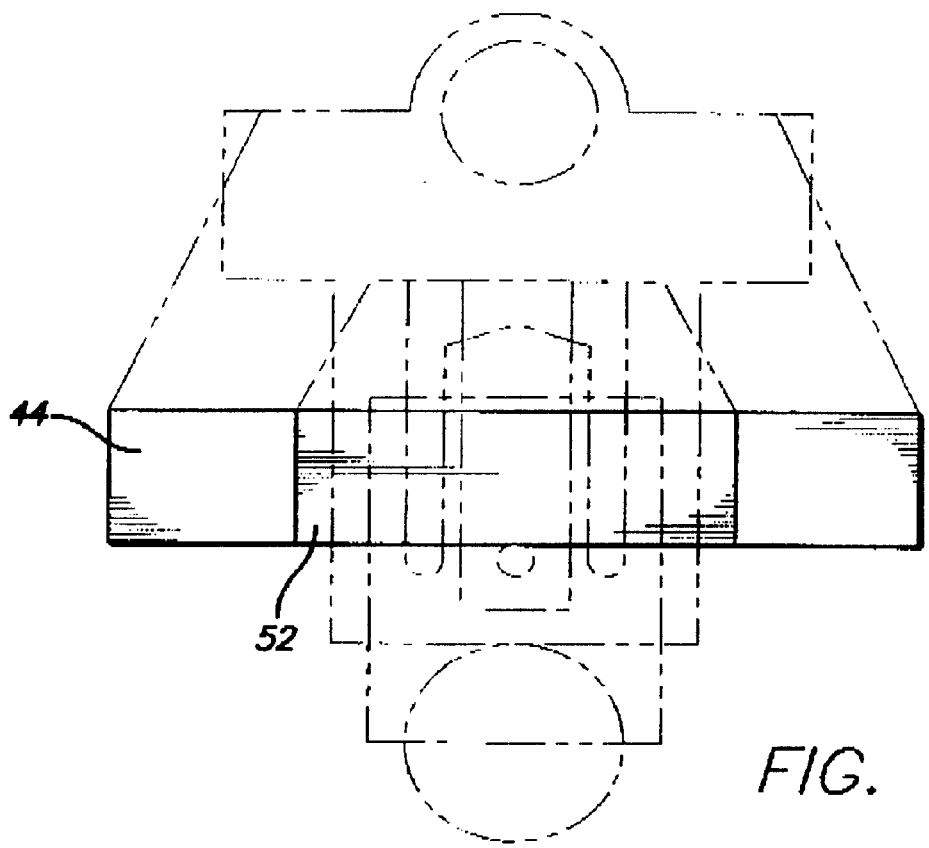
FIG. 7 is a top plan view of the mounting plate portion thereof.

The invention provision of a chip-supported suspension is particularly useful for ultra compact disk drive suspension applications. Compactness in size, as little as 0.300 cubic inch, or 0.220 inch in the transverse dimension, while retaining the responsiveness and pre-loading capabilities of larger suspensions, is characteristic of the invention device. The invention compactness derives in significant part from the stacking, one over the other of the several suspension elements, including particularly locating the mounting plate in superposed position above (or below) the load beam, the flexure and the head slider which are themselves shaped and stacked one upon the other for compactness.

With reference now to the drawings in detail, initially, a suspension to be supported on an actuator by a preamplifier circuit chip is shown in FIGS. 1–8. The disk drive suspension 10 includes a generally E-shaped load beam 11 having a base 12 and extending generally normally thereto a left portion 14, a right portion 16 and a center portion 18. The load beam left and right portions 14, 16 define spring sections of the load beam 11. The center portion 18 defines the dimple 32 and would be cantilevered and highly rigid in a conventional suspension, through the use of side rails for example. The suspension flexure 22 is substantially coextensive with the load beam 11 so as to permit attachment of the flexure shoulders 24, 26 to the left and right load beam portions 14, 16 e.g. at glue or weld locations 24a, 26a. Slider 28 is glued or welded to the tongue 21 cantilevered in frame 23 of the flexure 22 for gimballing movement about load beam dimple 32 to carry the read/write head 34, be it magnetic or optical (shown) in proper orientation to the surface 36 of disk 38.

For translational or angular movement the disk drive suspension 10 is mounted by its mounting plate 44, e.g., by adhesion, to a preamplifier circuit chip 41 which is in turn mounted, e.g., by adhesion to actuator arm 42. the mounting plate 44 is attached as by welding to the terminals 46, 48 of the load beam left and right portions 14, 16, thus to support the suspension in its intended place. The mounting plate 44 comprises an elongated metal strip which suitably has a center upset 52 for attachment to the chip 41 and thereby to actuator arm 42.

Figure 8:
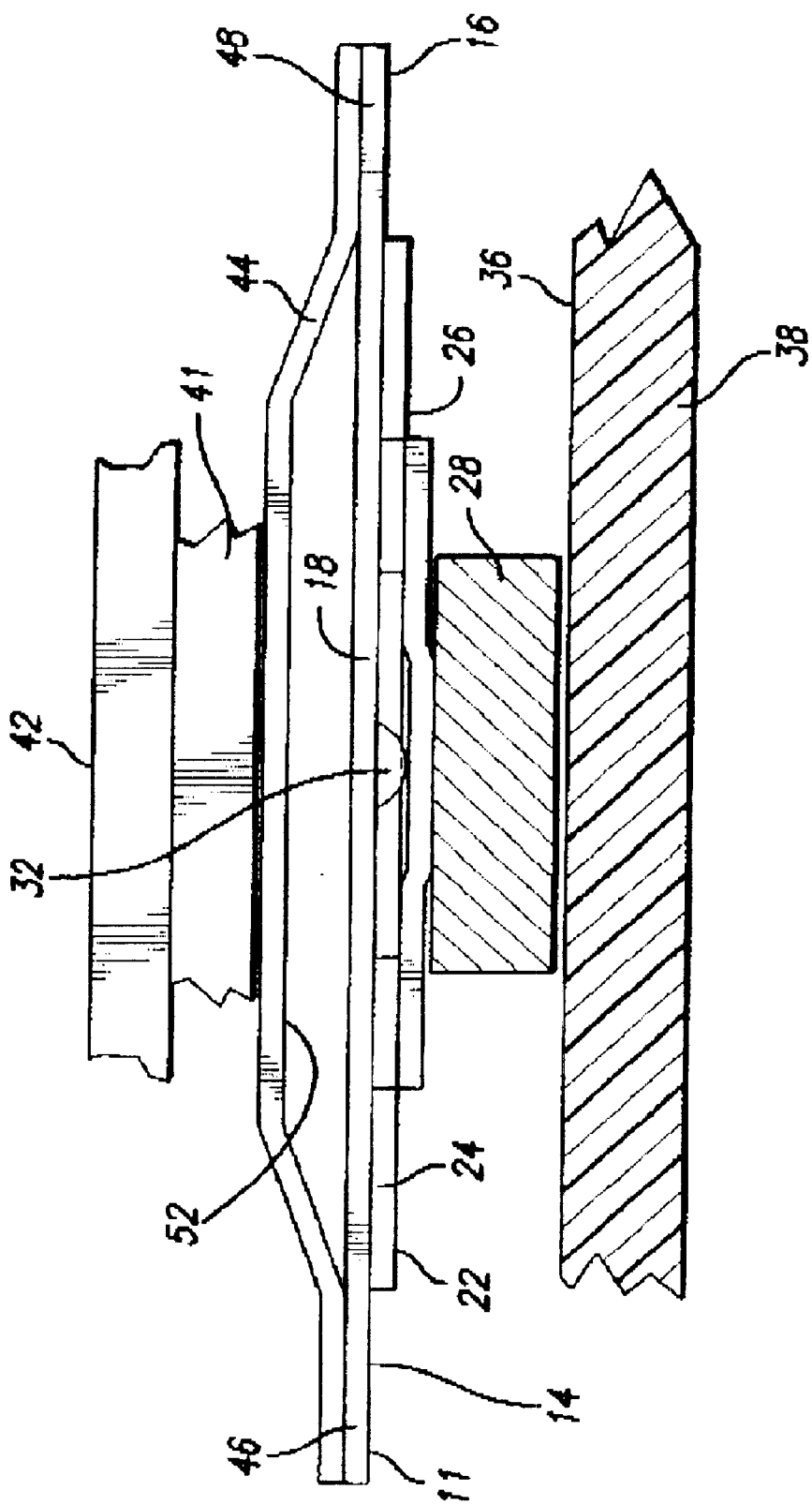
FIG. 8 is a view taken on line 8—8 in FIG. 1.

With reference now to the Figures, the actuator arm 42 is shown extending from an actuator (not shown) of more or less conventional design but which has relatively extended actuator arms. Since the present invention does not employ axially elongated load beam suspensions, the actuator arm 42 must be relatively extended, e.g. to place the preamplifier circuit chip 41 proximate to and opposite to the disk 38 (FIG. 8). The chip 41 is glued or otherwise attached to the near side (disk facing side) 60 of the actuator arm 42. The mounting plate 44 of the suspension 10 is attached to the chip 41 as previously described, and the suspension is thus suspended from and supported by the chip 41. The suspension 10 load beam portions 14, 16 support the flexure 22 in gimballing contact with load beam center portion 18, as described, with the slider 28 attached to the flexure.

In operation, the signals generated at the slider 28 are conducted through the extremely short leads 66 to the chip 41, preamplified there, and conducted via conductors 74 to conventional electronics.

The suspension components including the load beam 11, the flexure 22, and the mounting plate 44, are stacked in a common stack, one above the other. The chip 41 is within the common stack. The common stack occupies a cylindrical plane 80 which has a diameter not more than about 3 times the diameter of the chip. Thus, all the suspension components and the slider 28 itself will fit in this cylindrical plane 80. The result is an ultra compact assembly that is supported by the preamplifier circuit chip for the optimum arrangement of chip and conductor to achieve minimum signal interference and loss between the slider and the chip, and to avoid the cost and complications of placing the chip on the load beam or integrating the circuitry with the slider itself.

The foregoing objects are thus met.

We claim:

1. In combination: a preamplifier circuit chip and a disk drive suspension assembly comprising a slider and a flexure in operative association; the chip supporting the assembly on a disk drive actuator arn.

2. The combination according to claim 1, in which said assembly further includes a mounting plate adhered to said chip, said chip being adhered to said actuator arm to support said assembly on said actuator arm.

3. In combination, a disk drive suspension assembly and a chip, said suspension assembly being adapted for mounting on an actuator arm and comprising a flexure for supporting a slider in operative association with a disk, said chip having a first surface to which said assembly is mounted and a second surface adapted for mounting said chip to said actuator arm, said assembly being attached to said chip, said chip being attached to said actuator arm to support said assembly on said actuator arm.

4. The combination according to claim 3, in which said flexure, said slider. and said chip are arrayed within a cylindrical plane.

5. The combination according to claim 4, including also a mounting plate, and in which said mounting plate is attached to said assembly in flexure bridging relation.

6. The combination according to claim 5, in which said actuator arm extends longitudinally in a predetermined first plane to be generally parallel with the disk drive disk; said assembly flexure, mounting plate and chip being arrayed within said cylindrical plane, said cylindrical plane intersecting said actuator arm first plane.

7. The combination according to claim 6, in which said cylindrical second plane intersects said actuator arm first plane at a right angle.

8. The combination according to claim 7, in which said cylindrical plane has a diameter sufficient to surround said assembly and no greater than three times a diameter necessary to surround said chip.

9. The combination according to claim 8, in which said chip is attached to said mounting plate at the locus of said flexure-bridging.

10. The combination according to claim 9, including also a load beam and in which said load beam has generally an E-shape with a base, and extending from said base a center portion, a left portion and a right portion all generally extending in a load beam plane, said flexure generally extending in a flexure plane spaced from and generally parallel to said load beam plane, said flexure being attached to said left and right load beam portions and in gimballing contact with said load beam, said slider being supported by said flexure for operative association with said disk, said mounting plate extending in a mounting plate plane spaced from and generally parallel to said flexure plane, said mounting plate being attached to said load beam at its said left and right portions only to bridge said flexure.

11. The combination according to claim 10, in which said mounting plate is centrally deflected, said mounting plate being adhered to said chip at said deflection.

* * * * *